Patented Sept. 30, 1930

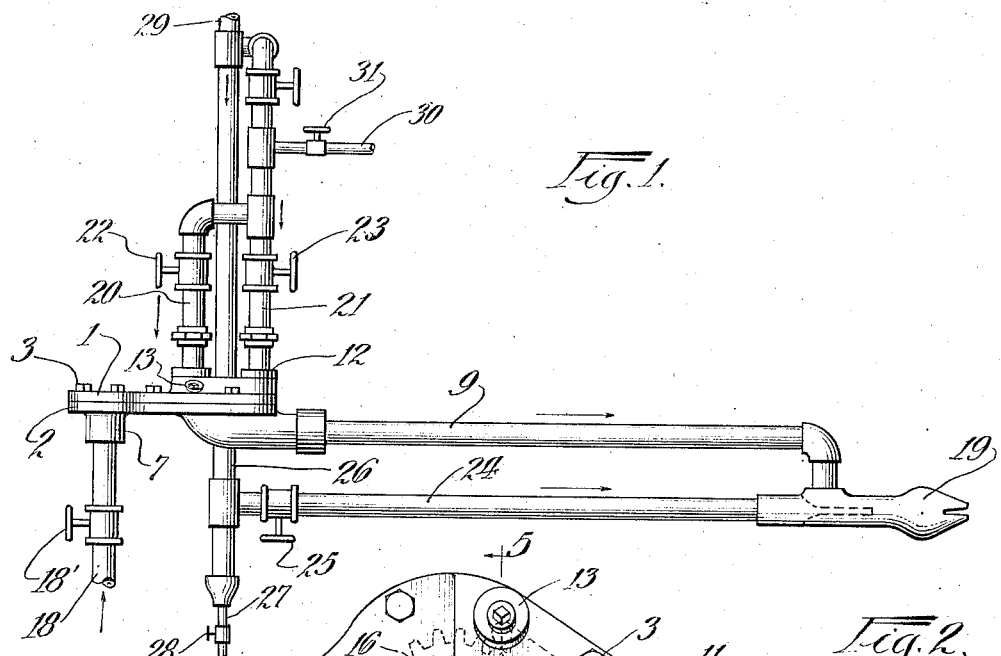

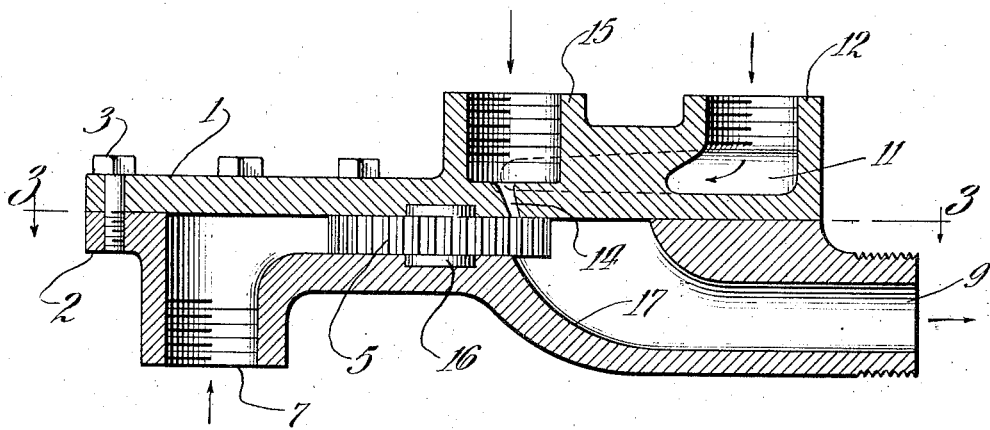
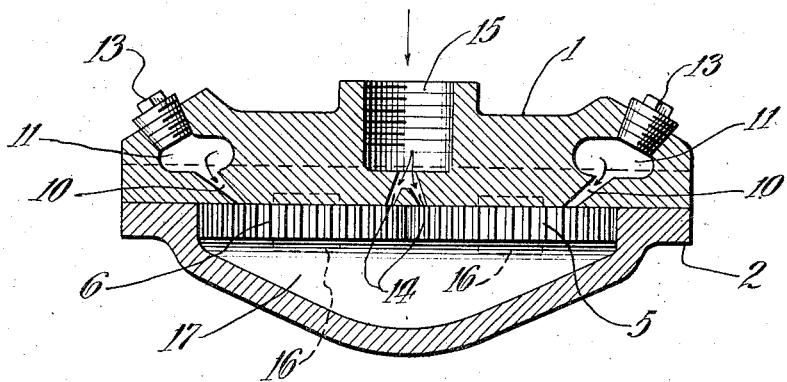

1,776,834

UNITED STATES PATENT OFFICE

LYMAN C. HUFF, OF CHICAGO, ILLINOIS, ASSIGNOR TO UNIVERSAL PRODUCTS COMPANY, OF CHICAGO, ILLINOIS, A CORPORATION OF SOUTH DAKOTA

ROTARY CONTROL VALVE FOR PUMPS

Substitute for application Serial No. 51,527, filed August 20, 1925. This application filed March 21, 1927. Serial No. 176,902.

This is a substitute application filed by me, Serial No. 51,527, filed August 20th, 1925.

This invention relates to improvements in rotary control valves, and refers more particularly to a construction of valve peculiarly adaptable for use with heavy or viscous oils, or oils containing suspended solid particles such as carbon or other foreign particles.

One of the chief difficulties experienced with types of valves now on the market for handling oils of the above described character has been that the valve orifice is so small that it clogs within a short time, due to the viscosity of the oil or the accumulation of solid particles immediately adjacent the orifice.

The valve of the present invention overcomes all these difficulties in a very simple, yet extremely effective manner. In brief, the valve consists of a housing having inlet and discharge, in which housing are located rotary gears adapted to mesh. The liquid introduced, generally under super-atmospheric pressure, is directed against the exterior peripheries of the gear wheels, thus placing regulated portions of liquid in the compartments between the gear teeth. The liquid is carried around in these compartments and discharged to the point of use.

One of the features of the present invention contemplates means for accurately regulating the speed of rotation of the gears, including means for clearing the surfaces of the gear teeth on which solid particles might have a tendency to accumulate.

Various advantages and objects of the present invention will be immediately apparent from the following description:

In the drawings:

Fig. 1 is a diagrammatical elevational view of a system employing the valve of the present invention.

Fig. 2 is an enlarged top plan view of the valve with certain parts in dotted lines.

Fig. 3 is a cross-sectional view, taken on line 3—3 of Fig. 4.

Fig. 4 is a cross sectional view taken on lines 4—4 of Fig. 2.

Fig. 5 is a cross sectional view taken on lines 5—5 of Fig. 2.

Referring more in detail to the present invention, the valve chamber comprises upper and lower sections designated 1 and 2 respectively. These sections may be bolted or otherwise secured together by means of bolts 3 and bolt holes 4.

The lower section of the valve chamber contains the gear wheels 5 and 6 which mesh together and rotate in opposite directions. The section 2 is flared outwardly on both sides intermediate its length to accommodate the gear wheels 5 and 6, it being understood that the outer peripheries of these gear wheels are closely confined within the housing. Oil or other liquid enters the valve chamber through the inlet 7, and is preferably under a super-atmospheric pressure which may be of course from 3 to several hundred pounds, more or less. The gear wheels are caused to rotate in the direction of the arrows and the oil enters the spaces 8 between the gear teeth. It will be seen that the quantity of liquid in each compartment 8 is accurately regulated and those regulated quantities are discharged through the valve discharge 9. The quantity of liquid, of course, depends upon the speed at which the gear wheels are rotating. The oil passing out through the discharge 9 may be forced to any point for use.

Referring now more particularly to the construction shown in Fig. 5, nozzles 10 are provided communicating with channels 11 and inlet 12. These nozzles 10 receive a gas, such as air, steam, or the like, under pressure through the inlet 12 and channels 11, said gas discharging against one side of the teeth of the gear wheels 5 and 6. This causes the gear wheels to rotate in opposite direction. In addition to imparting motion to the gear wheels, the gas under pressure, such as steam or air, cleans the small compartments or spaces 8 between the gear wheels of any solid particles that may be carried through the valve. These nozzles may be referred to in the following description as the driving nozzles. Plugs 13 are provided for the purpose of allowing the channels 11 or nozzles 10 to be cleaned at any time.

In order to control and regulate the speed of rotation of the gear wheels 5 and 6 more closely, another set of nozzles 14 are provided for directing gas under pressure, such as steam, air, or the like, against the opposite surfaces of the gear teeth, from those surfaces against which the nozzles 10 direct a gas. One of the functions performed by the nozzles 14 is to resist the rotation of the gear wheels 5 and 6 which has been produced by the driving nozzles 10. Inlet 15 communicates with the nozzles 14, through which the gas under pressure is introduced. In addition, as shown very clearly in Fig. 4, the gas under pressure introduced through the nozzles 14, acts as a means for cleaning the spaces between the teeth of any solid material that may be carried through the valve.

It is understood that the gear wheels 5 and 6 are mounted in any manner, and may be provided, for instance, with the stub shafts 16 bearing in the upper and lower sections 1 and 2 of the valve chamber.

As another feature of the present invention, the gear wheels at a point just before the nozzles 10 and 14, as shown clearly in Figs. 4 and 5, may overhang a ledge 17 in the discharge 9, allowing the gas under pressure to blow down between the teeth carrying out any solid particles which are diverted through the discharge line. This provides a free and uninterrupted passage for said gas under pressure, and also removes all foreign particles as explained.

Referring now more particularly to the construction shown in Fig. 1, which is an assembly of piping, in which the valve of the present invention may be installed, the liquid is introduced through the line 18 and through inlet 7 into the valve of the present invention. The outlet 9 may be connected for instance to the nozzle 19 of an oil burner. Steam or air may be admitted to the rotary liquid control valve of the present invention through the connections 20 and 21, controlled by valves 22 and 23. These latter valves are preferably needle valves. The steam and air exhausting from the nozzles mixes with the oil, passes through the valve, and passes as a mixture through line 9 to the nozzle 19, where it is atomized by steam introduced through the line 24, controlled by valve 25, which line 24 is connected to the steam inlet line 26. This latter line may be provided with a drain 27, controlled by valve 28.

The oil supply to the valve is preferably under a constant pressure, which causes the gear wheels to rotate and discharge regulated amounts of oil due to the unbalanced condition of the gear teeth when being meshed on one side and opened on the other. The speed of rotation may be accurately regulated as heretofore described. It is advisable to keep a certain amount of gas under pressure, discharging through both sets of nozzles 10 and 14, in order to keep the gear teeth clean.

By means of the present invention, it will be readily apparent that I am enabled to pass through the valves oils of any viscosity, and also oils which may contain suspended solid particles without in any way affecting the operation.

The pressure may be held constant by a regulator. The inlet 29 may be for steam, and the inlet 30, controlled by valve 31, may be utilized for air. A valve 18' is interposed in the inlet line 18.

The device functions both as a valve and a pump. The liquid oil which is supplied to the burner through the valve is advancing under a superatmospheric pressure and of itself effects a rotation of the gears 5 and 6. If the rotation so effected is insufficient to supply the necessary amount of liquid, the gears can be further driven by the injection of gas through the channels 11 and nozzles 10. Should the force of the oil be so great as to cause the passage of too great a quantity of oil through the pump or valve mechanism, the rotation of the gears can be retarded by the injection of the gas through the nozzles 14. Furthermore, a very accurately controlled operation can be effected by simultaneously injecting gas through the nozzles 10 and 14, the amount of gas injected through these nozzles being respectively controlled to give the precise speed of rotation of the gears required. The operation further possesses the advantage of keeping the teeth of the gears always free from carbonaceous substances accumulating thereon.

I claim as my invention:

1. A rotary liquid control valve, comprising a valve chamber having inlet and outlet, gears in said chamber adapted to rotate in opposite directions and mesh with each other, means acting on the surface of said gears for controlling the speed of rotation of the gears to control the quantity of liquid discharged from said valve chamber.

2. A rotary liquid control valve, comprising a valve chamber having inlet and outlet, gears in said chamber adapted to rotate in opposite directions and mesh with each other, means for controlling the speed of rotation of the gears to control the quantity of liquid discharged from said valve chamber, including means for introducing a gas under pressure to be directed against opposite faces of the gear teeth.

3. A liquid control valve, comprising a valve chamber having liquid inlet and outlet, rotating elements within said chamber, against which the liquid introduced is projected, means acting on the surface of said elements for regulating the speed of rotation of said rotating elements, and means to regulate the quantity of liquid discharged from the valve chamber.

4. A liquid control valve, comprising a valve chamber, having liquid inlet and outlet, gears mounted therein adapted to mesh with each other and rotate in opposite directions, the space between the gear teeth being of a size to allow regulated amounts of oil containing solid particles to be carried through the valve without clogging the valve or effecting the amount of liquid discharged therefrom, and means for regulating the speed of rotation of the gears comprising means for discharging gas under pressure against said gears.

5. A liquid control valve, comprising a valve chamber having liquid inlet and outlet, gears mounted therein adapted to mesh with each other, and rotate in opposite directions, means for introducing gas under pressure against similar surfaces of the gear teeth, in order to rotate same, means for introducing gas under pressure directed against the opposite similar surfaces of the gear teeth to offer resistance to the rotation caused by the introduction of gas through the first mentioned means, these means accurately controlling the speed of rotation of the gears.

6. In a device for regulating flow of oil, means for positively conveying substantially equal increments of oil through the device, means for continuously removing any foreign particles introduced with the oil from said conveying means, and means independent of said removing means for controlling the speed of said positive conveying means.

7. In a device for regulating flow of oil, means for positively conveying substantially equal increments of oil through the device, means for continuously removing any foreign particles introduced with the oil from said conveying means, and means independent of said removing means for controlling the speed of said positive conveying means, said removing means also serving to drive said conveying means.

LYMAN C. HUFF.